United States Patent [19]

De Young

[11] 3,888,766

[45] June 10, 1975

[54] OIL SORPTION MATERIAL

[75] Inventor: Wayne J. De Young, Argos, Ind.

[73] Assignee: Uniroyal, Inc., New York, N.Y.

[22] Filed: Mar. 9, 1973

[21] Appl. No.: 340,613

[52] U.S. Cl. .................... 210/36; 106/2; 117/65.2;
 117/98; 117/138.8 D; 134/6; 210/40;
 210/DIG. 21
[51] Int. Cl. .......................................... E02b 15/04
[58] Field of Search ............ 106/2; 117/98, 138.8 R,
 117/65.2, 138.8 D; 210/36, 40, 503, 504,
 DIG. 21; 134/6, 40

[56] References Cited
UNITED STATES PATENTS

| | | | |
|---|---|---|---|
| 3,591,494 | 7/1971 | Crouch et al. | 210/40 |
| 3,598,729 | 8/1971 | Baumann | 210/DIG. 21 |
| 3,677,982 | 7/1972 | Marx | 117/98 |
| 3,681,237 | 8/1972 | Orban | 210/36 |
| 3,739,913 | 6/1973 | Bogosian | 210/DIG. 21 |

FOREIGN PATENTS OR APPLICATIONS

| | | | |
|---|---|---|---|
| 666,990 | 11/1965 | Belgium | 210/DIG. 21 |

*Primary Examiner*—Charles N. Hart
*Assistant Examiner*—Ivars Cintins
*Attorney, Agent, or Firm*—Norbert P. Holler, Esq.

[57] ABSTRACT

Cellular materials impregnated with a hydrophobic and oleophilic sealant in an amount sufficient to coat the surfaces of the cells or capillary domains, for use in absorbing oil and like pollutants from the surfaces of either solids or liquids, are disclosed. In the preferred form of the invention, such a material is made by impregnating a sheet of open-celled polyurethane foam with a solution or latex of a sealant inert to water but capable of being swelled or dissolved by oil, drying the sheet by driving off all or part of the liquid medium, and compressing the sheet while the impregnated sealant is tacky, so that the sealant acts to retain the sheet in its compressed state. The resultant article is characterized by the unique quality of being relatively inactive when in contact with water, but becoming activated by oil, so that a rapid absorption of large amounts of the oil is effected. The cellular material may also be a foam in chopped or powder form, or a fibrous non-woven batt, and is particularly advantageous in selectively removing residual films of oil from the surface of a body of water. This abstract is not to be taken either as a complete exposition or as a limitation of the present invention, however, the full nature and extent of the invention being discernible only by reference to and from the entire disclosure.

11 Claims, No Drawings

OIL SORPTION MATERIAL

BACKGROUND OF THE INVENTION

1. Field of the Invention

This invention relates to the art of removing oils and like pollutants from the surfaces of solids and liquids, and is of particular advantage in the removal from the surface of a body of water of a residual film of oil which cannot be removed by skimming and/or pumping.

2. Description of the Prior Art

The removal of oil from water can be accomplished by pumping if there is a sufficient thickness of oil in a given limited area, as when it is confined by a boom relatively shortly after the occurrence of a spill. Even so, however, a residue of oil always remains on the surface in the form of a thin film which continued pumping cannot remove. Frequently, there are also small spills on water where pumping is not feasible.

The general approach to the removal of small oil spills or thin layers of oil on water is to place an oil absorbing substance on the surface of the water. Preferred substances posses high surface areas and are preferably oleophilic/hydrophobic in their interaction with fluids. The substances may optionally be modified by suitable treatments in order to induce or enhance their oleophilic/hydrophobic characteristics. Examples of such treatments are described in U.S. Pat. Nos. 1,972,390, 2,824,022, 3,010,840 and others. Typically, the cellular material the oleophilic character of which is to be enhanced, is exposed to a modifying agent which may be in an emulsion, solution, vapor or particulate form. Suitable modifying agents have been all kinds of bituminous materials such as asphalt, coal tar pitch, and tall oil pitch, as well as waxes, metallic soaps, silicones, and other similar coatable, water-insoluble, oil-absorbing substances.

Previously employed sorbents may be categorized as inorganic, natural organic, polymeric foam, polymeric hydrocarbon, and miscellaneous products, according to the classification scheme applied by P. Schatzberg of the Naval Ship Research and Development Center in his Report No. 724110.1/2/1, titled "Investigation of Sorbents for Removing Oil Spills from Water" (November 1971). Examples of inorganic sorbents he refers to are asbestos, perlite powder, talc, volcanic ash, vermiculite, and the like. Representative natural organic sorbents are ground corn cob, wood fiber, fiberboard, hay, sawdust, straw, and the like. Polymeric foam sorbents are exemplified by polyurethane and urea formaldehyde foams. Examples of polymeric hydrocarbon sorbents are polyethylene, polypropylene and polystyrene normally formulated into powder, sheet, fiber or mat form, but Schatzberg also recognized that such polymeric hydrocarbon sorbents could be formulated into foam form as well. Miscellaneous sorbents are materials that do not belong to any of the afore-mentioned groups and are exemplified by cellulose fiber-perlite mixtures, plastic shavings, refuse compost, mixtures of synthetic fibers, and the like.

While most of the sorbent materials included in the above-mentioned groups have some utility in removing oil spilled on water, the inorganic, natural organic, and miscellaneous sorbents possess inadequate buoyancy retention and lower oil sorption capacity in comparison with the polymeric foam and polymeric hydrocarbon sorbents. Loss of buoyancy is attributed to displacement of air by water in the sorbent, resulting in a significant increase in average density. Even the polymeric foam and polymeric hydrocarbon sorbents, however, cannot resist a certain amount of absorption of water when exposed to water alone or to oil slicks on water. Thus, when these materials are deployed ahead of an advancing oil spill on water, they will experience some absorption of water before the oil reaches them. Also, these polymeric foam and polymeric hydrocarbon sorbents, when placed into an oil spill on water, penetrate the oil/water interface and begin, at those portions of their surfaces located below the oil level, to absorb water. In both of the aforementioned situations, the space taken up in the sorbent by the water is unavailable to the oil, and the efficiency of the sorbent is reduced correspondingly.

SUMMARY OF THE INVENTION

It is an important object of the present invention, therefore, to provide novel methods and means for removing oils and like pollutants from the surface of a body of water in a manner free of the drawbacks and disadvantages of the heretofore known processes of this type.

It is also an object of the present invention to provide such methods and means which are particularly advantageous for the removal of relatively thin films of oil not only from the surface of a body of water where their removal by pumping and/or skimming is not feasible, but from a solid surface as well.

Generally speaking, the objectives of the present invention are attained by the provision of an oil sorption material comprising a cellular material impregnated with a hydrophobic sealant which is oil-swellable or oil-soluble, the degree of impregnation being predetermined and optimized, in terms of the ratio of the weight of the sealant to the weight of the starting cellular material, to ensure that the latter will absorb only minimal quantities of water when exposed thereto, and that the mass of the impregnated sealant, once the same has dried and solidified, will not be so high as to retard the absorption of oil when the cellular material is exposed thereto.

By way of definition, the term "cellular material" as employed herein is intended to denote a variety of materials, including open-cell foams or sponges, and also fibrous mats, pads or battings fabricated from such substances as asbestos fibers, wood fibers, hay, straw, cotton, synthetic fibers, and the like, which mats, pads or battings are characterized by a skeleton structure formed with interconnected cells or capillary domains that allow fluids to penetrate inside and be retained. Of these, synthetic open-cell foams or sponges, as is well known, are generally made of various polymeric substances such as polyurethane, natural rubber, synthetic rubber, polypropylene, polyethylene, and the like, by incorporating a gas in the substance while the same is undergoing a transition from a liquid to a solid state. Natural sponges are remains of plant-like sea animals, having a porous structure and a tough, fibrous skeleton. Mats, pads, or battings are generally produced by random deposition of short fibers into web form on a moving belt followed by a suitable processing, such as heating, stitching, chemical treatment, adhesive bonding, and the like, to bond the web of individual fibers into a coherent, porous mass.

The term "sealant" as employed herein is intended to denote a variety of substances which are hydrophobic or inert to water and at the same time oleophilic or oil-sensitive, i.e., capable of being dissolved or swelled by oil, and which are either inherently tacky or are capable of being rendered tacky. Such substances include natural and synthetic rubbers, e.g. natural rubber, neoprene, polyisoprene, styrene-butadiene copolymer, polybutadiene, ethylene-propylene rubbers, and the like; synthetic resins such as phenol-formaldehyde resin, resorcinol-formaldehyde resin, certain saturated polyester resins (for example, such as is commercially available under the designation "Vitel"), and the like; and synthetic plastics such as polystyrene, styrene-acrylonitrile copolymer, poly-methylstyrene, certain polymeric derivatives of acrylic and methacrylic acid (for example, such as is commercially available under the designation "B-72"), ethylene-vinyl acetate copolymers (for example, such as is commercially available under the designation "VYHH"), and the like. The micro-structure of the rubbers and plastics may be atactic, syndiotactic or isotactic, although the atactic ones are preferred because they are more rapidly dissolved or swollen. The copolymers may have random or block structure, but the random structures are preferred because of their more rapid rate of solubility or swelling in oil. The sealant in its starting state may be inherently a liquid, or it may be a solid either dissolved in a suitable solvent or dispersed in an aqueous emulsion or latex.

In accordance with a refinement of the invention, the cellular material, after being impregnated with the sealant, may then be compressed to a greatly reduced thickness as a concomitant of the drying and solidification of the sealant. By virtue of its tackiness, the sealant then also serves to maintain the cellular material in its compressed condition until the sealant is swelled or dissolved by contact with oil. In such an arrangement it is found that the oil absorptive properties of the impregnated compressed cellular material are even better than the oil absorptive properties thereof when only impregnated but not compressed. At the same time, the retained compression provides yet another advantage in that the material takes up less space during both storage and shipment thereof prior to use.

The present invention also provides a method of producing the foregoing oil sorption material, this method comprising impregnating cellular material with a sealant in a liquid medium, thereby to coat the cells or capillary domains of the cellular material with the sealant, drying the impregnated material by driving off all or part of the liquid medium, if desired applying pressure to compress the impregnated material so that the sealant, being tacky, maintains the impregnated material in the compressed state after removal of the pressure, and, if needed, completing the drying. If the sealant is inherently tacky, the compression can be effected at ambient temperatures; otherwise, an application of a certain amount of heat may be required as a concomitant or adjunct of the compression operation.

The invention further provides a method of removing oil from a surface which it is contaminating and in particular for selectively removing oil from the surface of a body of water, which comprises contacting the oil-contaminated surface with an oil sorption material of the present invention.

DESCRIPTION OF THE PREFERRED EMBODIMENTS

The present invention is based on the discovery that a cellular material as herein defined, modified by impregnation, to a predetermined degree, with a hydrophobic and oleophilic sealant, i.e., one which is capable of being dissolved or swelled by oils, is a superior selective oil absorbent which does not lose its oil absorption efficiency when exposed to water before coming into contact with oil. Without limiting the scope of the invention to any particular theory, it is believed that the efficacy of the invention derives from the fact that the surfaces of the cells or capillary domains of the cellular material are coated with the oleophilic and hydrophobic substance. Thus, since the latter is capable of swelling and/or dissolving in oil but is not attacked by water, it enhances the oil absorptive character of the impregnated cellular material, so that only a minimal absorption of water occurs when the cellular material comes in contact with water, and that even when contact is made with water and oil, the impregnated cellular material becomes highly activated for absorption of oil without increasing its water absorption to any significant extent.

It is also contemplated by the present invention that the impregnated cellular material may be compressed while the sealant is in a tacky state. The sealant will thus act as a binder and will hold the cellular material in its compressed state until activated by contact with oil. It is found that the oil sorption capability of the compressed impregnated cellular material, like that of the impregnated only but uncompressed material, is not impaired by exposure to water and is actually even better than the oil sorption capability of the uncompressed cellular material. Moreover, by virtue of its retained smaller thickness, the compressed cellular material will occupy less space than the uncompressed material, thereby reducing the space requirements therefor in both storage and transit. The compression of the cellular material may, of course, be effected by any suitable means, for example, a hydraulic press or a set of pressure rollers. One or more of the press platens or one or more of the pressure rollers may be heated, if needed to induce or enhance the tackiness of the sealant. The pressure used may range from as little as about 1 psi to as much as about 300 psi, and the associated temperature may range from as low as room temperature (e.g. 20°–25°C.) to about 160°C.

As previously indicated, the sealant may be inherently a liquid, but it is preferred to use the same either in the form of a solution of the sealant in any appropriate organic solvent, e.g. such as hexane, xylene, toluene, naphtha and the like for a natural rubber sealant, or in the form of a latex. In either form, the solids content of such solutions and latices should normally range from about 0.5 percent to about 30 percent, and preferably from about 1 percent to about 6 percent, by weight based on the total weight of the solution or latex. Depending on the nature of the liquid medium, or course, it may be desirable to subject the impregnated cellular material to a mechanical and/or thermal drying operation to drive off some or all of the liquid medium, especially if the cellular material is then to be compressed. A mechanical treatment of this type may be simply a squeezing operation. A thermal treatment, on the other hand, would involve heating the impregnated cellular material to a temperature between about 65°C. to about 125°C. for a period of between about 15 minutes and 6 hours.

For the purposes of the present invention, the degree of impregnation of the cellular material should be sufficient to yield a sealant pick-up of between about 0.5 percent and about 30 percent by weight based on the dry weight of the starting, unimpregnated cellular material, with a pick-up in the range of about 3 percent to about 20 percent being preferred. The degree of compression, on the other hand, should be sufficient to reduce the thickness of the cellular material to between about 4 percent and about 15 percent of its original thickness, with a compression to about 7 percent of the starting thickness being preferred.

In the presently contemplated best mode of the invention, the cellular material is a body of a resilient open-cell polyurethane foam, and the sealant is natural rubber applied to the foam by impregnation in the form of a dilute solution of the rubber in a hydrocarbon solvent, e.g. hexane. An aqueous rubber latex would be equally acceptable. The concentration of the rubber in the liquid medium is about 4 percent by weight in either case. The impregnated polyurethane foam is squeezed to eliminate excess solution and then is dried for a desired time interval at an elevated temperature, the values of these parameters falling into the ranges thereof hereinbefore set forth. Thereafter, the dried impregnated foam is compressed, e.g. in a heated hydraulic press, under a pressure and temperature and for a time interval within the ranges of these parameters hereinbefore set forth, to a thickness of about 7 percent of the starting thickness of the foam. The tackiness of the rubber sealant ensures that the foam body will remain in its compressed state until it is used in an oil recovery operation.

The cellular material normally will be in sheet form, but it may also be in a chopped or highly fragmented form when first exposed to the sealant. The highly fragmented form is, however, preferably obtained by first treating a cellular material, in either the sheet or the chopped form, with the sealant, then drying and compressing the cellular material, and finally pulverizing the same. Such pulverized absorbent is found especially suited for use on solid surfaces, e.g. in the case of oil spills or leaks on a factory floor, oil drums, machinery, etc., whereas the sheet or chopped block form of absorbent is normally more suited for use on a body of water, especially if deployed in advance of an oil spill. Either type of absorbent form, it will be appreciated, is suitable for combating oil spills whether they occur on land or on water. It is to be understood that the term "oil" as used herein refers to all materials commonly known by that term, including hydrocarbon and aromatic liquids which are used in the trade as oils, lubricants and fuels, such as Bunker C, heavy crude, light crude, kerosene, gasoline, and the like.

In use, the impregnated cellular material of this invention, either in the compressed or uncompressed form, may be placed directly on the oil spill, but if the spill is on water, the sorbent can also be deployed either on the water or on a beach in advance of the oil spill. If the spill is on water and is contained by a boom, moreover, the sorbent may be used in absorbing all of the oil, or only that residual portion thereof which remains after pumping has removed the bulk of it. The sheet material sorbent when deployed on a beach in advance of an oil spill on water, or when deployed on water in advance of an oil spill, may be used as is, but the chopped sorbent should be contained in a foraminous envelope, such as netting made out of nylon, polyethylene, and the like. Examples of such techniques are described in South Africa Pat. Nos. 70/7433 and 71/2803. Where large amounts of oil are contained by a boom, the chopped sorbent is preferred because of its large surface to volume ratio. The sheet and powder forms are preferred where only thin oil films need to be removed from water.

Naturally, the oil can be extracted and recovered from the sorbent by passing the same through a set of pressure rollers, and after being used the cellular material can be retracted with sealant as necessary, compressed again if desired, and reused.

The following examples are merely illustrative of the present invention and are not limitative thereof.

EXAMPLE 1

This example illustrates the effect of a sealant on the ability of a foam to resist penetration by water. Open-cell polyurethane foam pieces, each 3 in. × 3 in. × 1.5 in. and weighing 6 grams, were impregnated by immersion in a 4 percent hexane solution of natural rubber, squeezed to remove excess impregnant, and then allowed to air dry at ambient temperature for three hours, followed by heating at 200°F. for ½ hour. Some of the impregnated and dried samples were further processed by compressing them to a thickness of about 7 percent of their starting thickness in a hydraulic press at ambient temperature (about 72° F.) and under a pressure of about 300 psi for a period of about 15 seconds. The sealant pick-up was about 4.3 percent by weight based on the weight of the starting foam. Samples of the unimpregnated foam, the impregnated and dried foam, and the impregnated, dried and compressed foam were submerged completely under water at 72°F for 2 hours. They were then removed, their surfaces blotted with absorbent paper, and weighed. Table I shows the amount of water (in grams) absorbed by the samples of each type of sorbent foam.

TABLE I

| Sample | Final Weight (g) | Initial Weight (g) | Absorbed Water (g) |
| --- | --- | --- | --- |
| Untreated foam | 138 | 6 | 132 |
| Impregnated-only foam | 28 | 6 | 22 |
| Impregnated and compressed foam | 16 | 6 | 10 |

Table I shows that the impregnated and compressed foam absorbs about 1/2 the amount of water absorbed by the impregnated-only foam, and about 1/13 the amount of water absorbed by the original, untreated foam.

EXAMPLE 2

This example illustrates the effect of a sealant on the oil-absorption efficiency of a foam. Open-cell polyurethane foam samples were prepared in the manner described in Example 1, but were not exposed to water. They were then placed on the surface of No. 3 oil at 72°F, and their absorption characteristics were observed in terms of the rate and amount of oil absorption. In measuring the rate of absorption, the end point for the first two types of samples was determined by the time required for the oil to permeate each sample and cause it to sink. In the case of the impregnated and compressed foam, the sample sank almost immediately, and the end point was, therefore, determined by the time required for the sample to expand to its original size. The time to saturation (in minutes) and the amount of oil absorbed (in grams) are shown in Table II.

TABLE II

| Sample | Time to Saturation (min.) | Oil[1] Absorbed (g) |
| --- | --- | --- |
| Untreated foam | 27 | 209 |
| Impregnated-only foam | 11 | 206 |
| Impregnated and compressed foam | 3 | 219 |

[1]All samples were 6 g. in weight before exposure to oil.

Table II clearly shows that the impregnated and compressed foam absorbs the oil faster than both the impregnated-only foam and the original untreated foam.

EXAMPLE 3

This example illustrates the efficiency of absorption of oil by foam after the foam has been impregnated with a sealant and then exposed to water. Open-cell polyurethane foam samples, prepared and exposed to water as described in Example 1, were placed on No. 3 oil, and the rate and amount of absorption were determined in the manner described in Example 2. The rate and absorption data are shown in Table III.

TABLE III

| Sample[1] | Time to Saturation (min) | Initial Weight[2] plus Water (g) | Oil Absorbed (g) |
| --- | --- | --- | --- |
| Untreated foam | 62 | 147 | 129 |
| Impregnated-only foam | 25 | 47 | 201 |
| Impregnated and compressed foam | 21 | 14 | 228 |

[1]All samples soaked in water first for 2 hours at 72°F
[2]All samples were 6 g. in weight before exposure to water.

Table III clearly shows that after soaking in water, the impregnated and compressed foam absorbs much less water and more oil, and absorbs the oil more quickly, than do the impregnated-only foam and the original untreated foam.

EXAMPLE 4

This example illustrates the efficiency of absorption of oil from water by foam which has been impregnated with a sealant. The foam samples were prepared in the same manner as those used in Example 2, but they were placed on a ¼ inch thick layer of No. 3 oil which was spread on water. By visual observation it was determined that the rate of oil absorption of the impregnated and compressed foam exceeded that of the impregnated-only foam which in turn had a greater rate of absorption than the untreated original foam. The samples were allowed to equilibrate with the oil/water interface for ½ hour. The samples were then removed and weighed, and the amount of oil absorbed by each was determined by squeezing the sample and allowing the oil and water expelled therefrom to separate. Table IV shows the amount of oil (in grams) absorbed by each sample.

TABLE IV

| Sample | Oil Absorbed (g) |
| --- | --- |
| Untreated foam | 102 |
| Impregnated-only foam | 133 |
| Impregnated and compressed foam | 231 |

Table IV clearly shows that the impregnated and compressed foam absorbs substantially more oil than the impregnated-only foam and the untreated original foam.

EXAMPLE 5

This example illustrates the efficiency of absorption of oil from water by foam which has been impregnated with a sealant and then was soaked in water before being exposed to oil. The foam samples were prepared in the same manner as those used in Example 3 but were placed on a ¼ inch layer of No. 3 oil which was spread on water. By visual observation it was determined that the rate of oil absorption of the impregnated and compressed foam exceeded that of the impregnated-only foam which in turn had a greater rate of absorption than the untreated original foam. The samples were allowed to equilibrate with the oil/water interface for ½ hour. The samples were then removed and weighed, and the amount of oil absorbed by each was determined by squeezing the sample and allowing the oil and water expelled therefrom to separate. Table V shows the amount of oil (in grams) absorbed by each sample.

TABLE V

| Sample | Oil Absorbed (g) |
| --- | --- |
| Untreated foam | 111 |
| Impregnated-only foam | 118 |
| Impregnated and compressed foam | 229 |

Again it is seen that the impregnated and compressed foam absorbed far more oil than the impregnated-only foam and the original untreated foam.

EXAMPLE 6

This example illustrates the effectiveness of natural rubber as a sealant when applied in the form of a latex to the cellular material. Open-cell polyurethane foam samples each 3 in. × 3 in. × 1.5 in. in size were impregnated with a natural rubber latex having a solids content of 3 percent by weight based on the total weight of the latex. The impregnated samples were dried for 30 minutes at a temperature of 220°F. and were then compressed under a pressure of 300 psi for 15 seconds at ambient temperature to a thickness of 7 percent of their starting thickness. Respective samples of the impregnated and compressed foam were exposed to water as in Example 1, to oil as in Example 2, and to water and oil as in Example 3. Pertinent data describing the absorption characteristics of the samples are set forth in Table VI.

TABLE VI

| Sample Exposed to | Time to Oil Saturation (min) | Water[1] Absorbed (g) | Oil[1] Absorbed (g) |
| --- | --- | --- | --- |
| water only | — | 8 | — |

TABLE VI-Continued

| Sample | Time to Oil Saturation (min) | Water[1] Absorbed (g) | Oil[1] Absorbed (g) |
|---|---|---|---|
| Exposed to oil only | 5 | — | 240 |
| Exposed to water and oil | 10 | 8 | 228 |

[1]All samples were 6 gms. in weight before exposure to water.

A comparison of the data in Table VI with those in Tables I, II and III clearly shows that natural rubber applied to the foam out of a latex is as effective as a sealant as when it is applied out of a solution.

It is to be expected, of course, that the use of synthetic rubbers and rubbery substances in lieu of natural rubber in experiments corresponding to those described in the preceding examples, as well as the use of comparable resins and plastics of the types herein disclosed, will provide similar results.

EXAMPLE 7

This example illustrates the ability of various substances other than natural rubber to serve as sealants for open-cell polymer foams in accordance with the teachings of the present invention. Samples of open-cell polyurethane foam, each 3 in. × 3 in. × 1.5 in. in size, were impregnated with solutions of respective sealants selected from among those hereinbefore referred to. The samples were compressed to a thickness of 7 percent of their starting thickness and then were exposed to water and/or oil. Their absorption characteristics were then determined. The pertinent data are shown in Table VII.

TABLE VII

| Sealant | Solvent and Concentration (wt./wt.) | Sealant[1] Pickup (%) | Time to Oil[2] Saturation (min.) | Water[3] Absorbed (g) | Oil[4] Absorbed (g) |
|---|---|---|---|---|---|
| B-72 | Methylethyl Ketone (10%) | 17.2 | 1 | 15 | 214 |
| VYHH | Methylethyl Ketone (10%) | 16.5 | 5 | 22 | 208 |
| VITEL | Toluene (10%) | 19.5 | 5 | 36 | 188 |

[1]Based on weight of original foam; final compressed foam weight was 6 gms.
[2]Compressed foam exposed to oil only.
[3]Compressed foam exposed to water only.
[4]Compressed foam exposed to water first and then to oil.

A comparison of the data of Table VII with those of Tables I, II and III clearly shows the capacity of these substances to serve as hydrophobic/oleophilic sealants in an open-cell cellular material in lieu of rubber.

It will be understood that the foregoing description of preferred embodiments of the present invention is for the purposes of illustration only, and that the various process steps and relationships as well as the materials and proportions thereof herein disclosed are susceptible to a number of modifications and changes none of which entails any departure from the spirit and scope of the present invention as defined in the hereto appended claims.

What is claimed is:

1. A composition of matter for selectively absorbing oil from a surface supporting the same, comprising a polyurethane foam compressed to a thickness of about 7 percent of the starting thickness, said foam having a multiplicity of open cells or capillary domains therein and being impregnated with between about 4 and 20 percent by weight, based on the weight of the starting foam, of a sealant of natural rubber, said sealant coating the surface of said cells or capillary domains of said compressed foam and thereby minimizing the capability of said foam to absorb water when exposed thereto while maximizing the capability of said foam to absorb oil when exposed thereto, and said sealant also serving as a binder to retain said compressed foam in its compressed state until said sealant is dissolved or swelled by oil upon being contacted thereby.

2. A composition of matter as claimed in claim 1, wherein said sealant is a natural rubber from a latex.

3. A method of removing oil from an oil-contaminated surface, comprising contacting said contaminated surface with the composition of matter of claim 2.

4. A composition of matter as claimed in claim 1, wherein said sealant is a natural rubber from a solution.

5. A composition of matter as claimed in claim 4, wherein said solution is about a 4 percent hexane solution.

6. A method of removing oil from an oil-contaminated surface, comprising contacting said contaminated surface with the composition of matter of claim 4.

7. A method of removing oil from an oil-contaminated surface, comprising contacting said contaminated surface with the composition of matter of claim 1.

8. A method of producing the composition of matter of claim 1, said method comprising the steps of impregnating a polyurethane foam having a multiplicity of open cells or capillary domains therein with a liquid comprising a sealant of natural rubber, removing excess liquid from said foam so that the foam contains between about 4 to 20 percent of said sealant, based on the weight of the starting foam, treating said foam to render the impregnated sealant tacky, and compressing said impregnated foam to a thickness of about 7 percent of its starting thickness, whereby the tackiness of said sealant is utilized to retain said foam in its compressed state until said sealant is dissolved or swelled by oil upon being contacted thereby.

9. The method of claim 8, wherein the sealant is a natural rubber from a latex.

10. The method of claim 8, wherein the sealant is a natural rubber from a solution.

11. The method of claim 10, wherein said solution is about a 4 percent hexane solution.

* * * * *